US008886705B1

(12) United States Patent
Tewari et al.

(10) Patent No.: US 8,886,705 B1
(45) Date of Patent: Nov. 11, 2014

(54) GOAL-ORIENTED STORAGE MANAGEMENT FOR A DISTRIBUTED DATA STORAGE NETWORK

(75) Inventors: Ruchir Tewari, Sunnyvale, CA (US); Xiaohui "Dawn" Chen, Milpitas, CA (US); Gregory L. Slaughter, San Jose, CA (US); Thomas E. Saulpaugh, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1046 days.

(21) Appl. No.: 10/609,921

(22) Filed: Jun. 30, 2003

(51) Int. Cl.
*G06F 15/16* (2006.01)

(52) U.S. Cl.
USPC .......................................... 709/203; 709/223

(58) Field of Classification Search
CPC .............. H04L 67/104; H04L 67/1044; H04L 67/1046; H04L 67/1048; H04L 67/1061; H04L 67/1065; H04L 67/1068; H04L 67/107; H04L 67/1095; H04L 67/1097; H04L 69/329; H04L 41/0893; H04L 29/08135; H04L 45/46; H04L 67/10; G06F 17/30194; G06F 17/30206; G06F 17/30209; G06F 9/5027; G06F 9/505; G06F 9/5072; G06F 11/203; G06F 17/30575
USPC .......................................................... 709/203
See application file for complete search history.

(56) References Cited

U.S. PATENT DOCUMENTS

| | | | |
|---|---|---|---|
| 4,354,229 A | 10/1982 | Davis et al. | |
| 5,606,669 A | 2/1997 | Bertin et al. | |
| 5,689,706 A | 11/1997 | Rao et al. | |
| 5,710,885 A * | 1/1998 | Bondi | 709/224 |
| 5,761,421 A | 6/1998 | van Hoff et al. | |
| 5,764,982 A | 6/1998 | Madduri | |
| 5,790,553 A | 8/1998 | Deaton, Jr. et al. | |
| 5,802,278 A | 9/1998 | Isfeld et al. | |
| 5,832,195 A | 11/1998 | Braun et al. | |
| 5,918,017 A | 6/1999 | Attanasio et al. | |
| 5,920,566 A | 7/1999 | Hendel et al. | |
| 5,928,326 A | 7/1999 | Boudou et al. | |
| 6,012,096 A | 1/2000 | Link et al. | |
| 6,016,478 A | 1/2000 | Zhang et al. | |
| 6,044,367 A * | 3/2000 | Wolff | 707/2 |
| 6,049,823 A | 4/2000 | Hwang | |
| 6,088,336 A | 7/2000 | Tosey | |
| 6,091,724 A | 7/2000 | Chandra et al. | |
| 6,144,992 A | 11/2000 | Turpin et al. | |
| 6,148,383 A | 11/2000 | Micka et al. | |
| 6,167,432 A | 12/2000 | Jiang | |
| 6,173,293 B1 | 1/2001 | Thekkath et al. | |

(Continued)

OTHER PUBLICATIONS

Castro, Miguel; Druschel, Peter; Kermarrec, Anne-Marie; Rowstron, Antony; "Scalable application-level anycast for highly dynamic groups"; Microsoft Research; Nov. 30, 2002; pp. 1-5.*

(Continued)

*Primary Examiner* — Christopher Biagini
(74) *Attorney, Agent, or Firm* — Campbell Stephenson LLP

(57) ABSTRACT

A system and method for performing goal-oriented storage management for a distributed data storage network. Storage management software may execute on each node to cause the distributed data storage network to converge toward a system-wide storage goal. In various embodiments, the system-wide storage goal may be defined to accomplish any of various kinds of optimizations or performance improvements for the system, such as balancing storage utilization, achieving appropriate data replication, increasing performance, increasing fault tolerance, etc.

23 Claims, 4 Drawing Sheets

(56) References Cited

U.S. PATENT DOCUMENTS

| | | |
|---|---|---|
| 6,173,374 B1 | 1/2001 | Heil et al. |
| 6,185,618 B1 | 2/2001 | Brabson |
| 6,189,079 B1 | 2/2001 | Micka et al. |
| 6,219,710 B1 | 4/2001 | Gray et al. |
| 6,272,386 B1 | 8/2001 | McLaughlin et al. |
| 6,275,888 B1 | 8/2001 | Porterfield |
| 6,304,980 B1 | 10/2001 | Beardsley et al. |
| 6,314,491 B1 | 11/2001 | Freerksen et al. |
| 6,317,438 B1 | 11/2001 | Trebes, Jr. |
| 6,415,280 B1 | 7/2002 | Farber et al. |
| 6,434,638 B1 | 8/2002 | Deshpande |
| 6,553,031 B1 | 4/2003 | Nakamura et al. |
| 6,584,075 B1 | 6/2003 | Gupta et al. |
| 6,611,872 B1 | 8/2003 | McCanne |
| 6,625,604 B2 | 9/2003 | Muntz et al. |
| 6,631,449 B1 | 10/2003 | Borrill |
| 6,636,886 B1 | 10/2003 | Katiyar et al. |
| 6,643,650 B1 | 11/2003 | Slaughter et al. |
| 6,667,957 B1 | 12/2003 | Corson et al. |
| 6,748,381 B1 | 6/2004 | Chao et al. |
| 6,782,389 B1 | 8/2004 | Chrin et al. |
| 6,839,769 B2 | 1/2005 | Needham et al. |
| 6,850,987 B1 | 2/2005 | McCanne et al. |
| 6,871,235 B1 | 3/2005 | Cain |
| 6,985,928 B2 * | 1/2006 | Zhang et al. ............... 709/213 |
| 7,039,694 B2 * | 5/2006 | Kampe et al. ............... 709/222 |
| 2001/0042221 A1 * | 11/2001 | Moulton et al. ............... 714/5 |
| 2002/0065919 A1 | 5/2002 | Taylor et al. |
| 2002/0103998 A1 | 8/2002 | DeBruine |
| 2002/0114341 A1 | 8/2002 | Sutherland et al. |
| 2002/0143855 A1 | 10/2002 | Traversat et al. |
| 2002/0147771 A1 | 10/2002 | Traversat et al. |
| 2002/0147815 A1 | 10/2002 | Tormasov et al. |
| 2002/0184310 A1 * | 12/2002 | Traversat et al. ............ 709/204 |
| 2002/0184311 A1 | 12/2002 | Traversat et al. |
| 2003/0041141 A1 | 2/2003 | Abdelaziz et al. |
| 2004/0044727 A1 | 3/2004 | Abdelaziz et al. |
| 2004/0064512 A1 | 4/2004 | Arora et al. |
| 2004/0064556 A1 * | 4/2004 | Zhang et al. ............... 709/225 |
| 2004/0064568 A1 | 4/2004 | Arora et al. |
| 2004/0088347 A1 | 5/2004 | Yeager et al. |
| 2004/0088348 A1 | 5/2004 | Yeager et al. |
| 2004/0088646 A1 | 5/2004 | Yeager et al. |
| 2004/0098447 A1 | 5/2004 | Verbeke et al. |
| 2004/0148326 A1 | 7/2004 | Nadgir et al. |
| 2004/0162871 A1 | 8/2004 | Pabla et al. |

OTHER PUBLICATIONS

SCRIBE Home Page, Microsoft Research, accessed as viewable on Feb. 5, 2005 via the Internet Archive: <http://web.archive.org/web/20030205101414/http://www.research.microsoft.com/~antr/SCRIBE/>.*

"IEEE INFOCOM 2003 Home Page." IEEE. Accessed Jul. 26, 2008: <http://www.ieee-infocom.org/2003/>.*

A. Rowstron and P. Druschel. Storage management and caching in PAST, a large-scale, persistent peer-to-peer storage utility. In Proc. SOSP, Oct. 2001.*

Castro, Miguel. "SCRIBE: A large-scale and decentralized application-level multicast infrastructure." IEEE Journal on Selected Areas in Communications, vol. 20, No. 8, Oct. 2002. pp. 100-110.*

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

Zhao, et al "Tapestry: An Infrastructure for Fault-tolerant Wide-area Location and Routing" *UCB Tech. Report UCB/CSD-01-1141*. Apr. 2001.

Stoica, et al "Chord: A Scalable Peer-to-peer Lookup Service for Internet Applications," *ACMSIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5th OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"Lustre Whitepaper Version 1.0" Cluster File Systems, Inc., Nov. 11, 2002.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21.

Traversat, et al, "Project JXTA Virtual Network", Feb. 5, 2002, http://www.jxta.org/docs/JXTAprotocols.pdf.

* cited by examiner

GOAL-ORIENTED STORAGE MANAGEMENT FOR A DISTRIBUTED DATA STORAGE NETWORK

BACKGROUND OF THE INVENTION

1. Field of the Invention

This invention relates to computer networks and, more particularly, to storage management for a distributed data storage network.

2. Description of the Related Art

As computer systems continue to produce and utilize ever-increasing amounts of data, the task of properly storing the data becomes increasingly important. In particular, the high degree of networking among computer systems and the need to support distributed applications has led to the development of the distributed data storage networks that are in use today.

Distributed data storage networks typically include a plurality of networked computer systems, where each computer system stores data for use by an organization or application. One benefit commonly provided by distributed data storage networks is data replication. Copies of particular portions of data, e.g., copies of files, may be stored on multiple computer systems in the distributed data storage network. Such data replication may enable faster retrieval of the data because the data can be retrieved from the computer system that is closest or fastest. Data replication may also result in increased available network bandwidth by reducing the need to forward data requests and data transfers throughout the network. Data replication may also increase the fault tolerance of an application, since if one computer system fails, the necessary data can still be obtained from another computer system that is still operational.

Some distributed data storage networks also employ the concept of storage fragmentation, where a unit of data is fragmented into multiple parts that are each stored on separate computer systems. The fragmented nature of the data may be transparent to the user and to client applications, who remain unaware of the details of how and where the data is stored.

As distributed data storage networks have become larger and more complex, the issue of storage management has become a great challenge. Storage management for a distributed data storage network includes issues such as controlling the level of data replication (e.g., the number of computer systems on which each portion of data is replicated), controlling the manner in which data is distributed among the computer systems (e.g., controlling the percentage of storage utilized on each computer system), etc.

Techniques for automatically controlling storage management issues for a distributed data storage network have been utilized in the prior art. However, prior approaches have typically involved configuring individual computer systems in the distributed data storage network to respond to statically configured policy rules (typically based on resource thresholds). It would be desirable to provide a system that instead responds to changes in its environment incrementally to move the system progressively to more optimal states as defined by one or more system-wide storage goals.

It may also be desirable to provide a de-centralized storage management solution. For example, it may be desirable to implement the distributed data storage network as a peer-to-peer network in which each node performs roughly equivalent functionality and does not rely on centralized servers. It may be desirable for the storage management solution to leverage resources available throughout the network to achieve a storage goal for the system as a whole.

SUMMARY

One embodiment of the invention relates to performing goal-oriented storage management for a distributed data storage network. A plurality of nodes may be coupled to each other to form the distributed data storage network. The nodes may store data in a distributed manner. Coupling the plurality of nodes to each other may comprise creating a plurality of links. Each link may comprise a virtual communication channel between two nodes. In one embodiment, the plurality of nodes may be coupled in a peer-to-peer manner.

Storage management software may execute on each node to cause the distributed data storage network to converge toward a system-wide storage goal. As used herein, the term "system-wide storage goal" may refer to a goal relative to the distributed data storage network as a whole, rather than a goal for any individual node in the network. In various embodiments, the system-wide storage goal may be defined to accomplish any of various kinds of optimizations or performance improvements for the system, such as storage utilization, data replication, performance, reliability, etc.

According to one embodiment, the storage management software executing on each node may repeatedly perform the following. The node may determine its local state. In various embodiments, determining the local state of the node may comprise determining any of various storage or operating characteristics of the node, depending on the goal defined for the system. For example, if the system-wide storage goal is designed to balance storage utilization equally across nodes in the network, then determining the local state of the node may comprise determining the amount of the node's storage that is currently utilized.

The node may also receive information indicative of states of other nodes. The information may specify similar storage or operating characteristics for the other nodes as were determined for the local node. For example, if the local state of the node specifies the percentage of the node's storage that is currently utilized, then the states of the other nodes may specify the percentage of storage utilized on the other nodes. Various techniques may be utilized to enable the node to receive information indicative of states of other nodes.

Depending upon the local state of the node and the information indicative of states of other nodes relative to the system-wide storage goal, the node may perform an action to modify the local state of the node. Any of various actions may be performed, depending on the particular storage goal and depending on how the local state of the node compares to the states of the other nodes. Exemplary actions include: initiating a transfer operation to transfer data to the node from another node; initiating a transfer operation to transfer data from the node to another node; and/or deleting data from the node.

For example, if the system-wide goal is to balance storage utilization equally across nodes in the network, then if the node determines that its storage utilization is less than the average storage utilization, the node may perform an action to initiate the transfer of data from a node with a larger percentage of its storage utilized.

As each node in the system repeatedly performs the operations described above, the system may converge upon the system-wide storage goal. The system may not be guaranteed of reaching the goal. However, the method may allow the system to continually move toward the goal, offering probabilistic assurances that the goal will be reached.

BRIEF DESCRIPTION OF THE DRAWINGS

A better understanding of the invention can be obtained when the following detailed description is considered in conjunction with the following drawings, in which.

Figure 1:
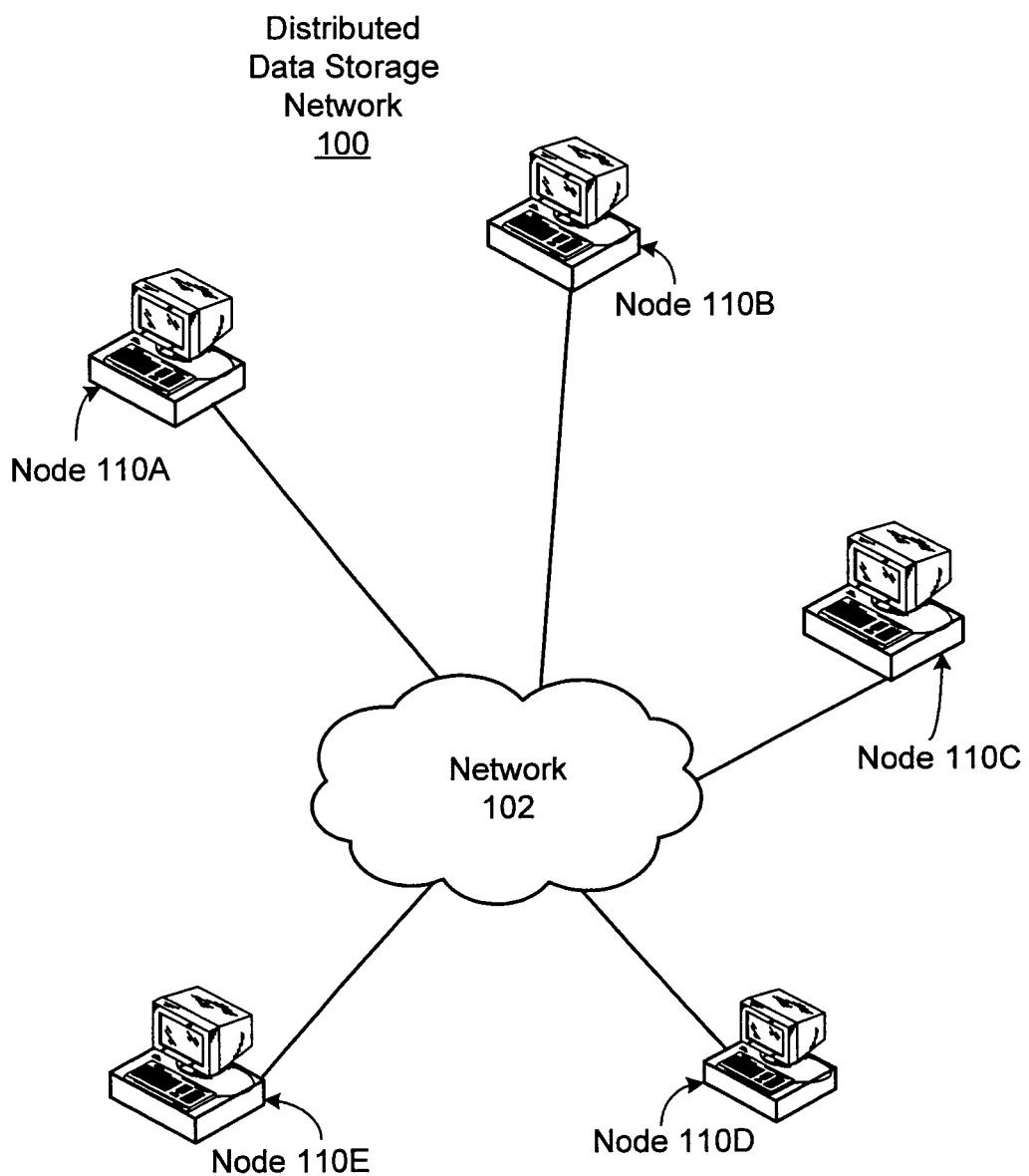
FIG. 1 illustrates a diagram of one embodiment of a distributed data storage network.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates a diagram of one embodiment of a distributed data storage network 100. The distributed data storage network 100 includes computing nodes (e.g., computer systems) 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Example local area networks include Ethernet networks and Token Ring networks. Also, each node 110 may be coupled to the network 102 using any type of wired or wireless connection mediums. For example, wired mediums may include: a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Data may be distributed among and stored on the nodes 110 in the manner described above in the Description of the Related Art. For example, in one embodiment, data replication may be utilized in the distributed data storage network 100 so that multiple copies of particular data portions (e.g., multiple copies of files) are stored on various nodes 110.

In one embodiment, the distributed data storage network 100 may be implemented as a peer-to-peer network. The peer-to-peer network may comprise a decentralized network of nodes 110 where each node has similar capabilities and/or responsibilities. Each node 110 may communicate directly with at least a subset of the other nodes 110. Messages may be propagated through the distributed data storage network 100 in a decentralized manner. For example, in one embodiment each node 110 in the network 100 may effectively act as a message router.

Figure 2:
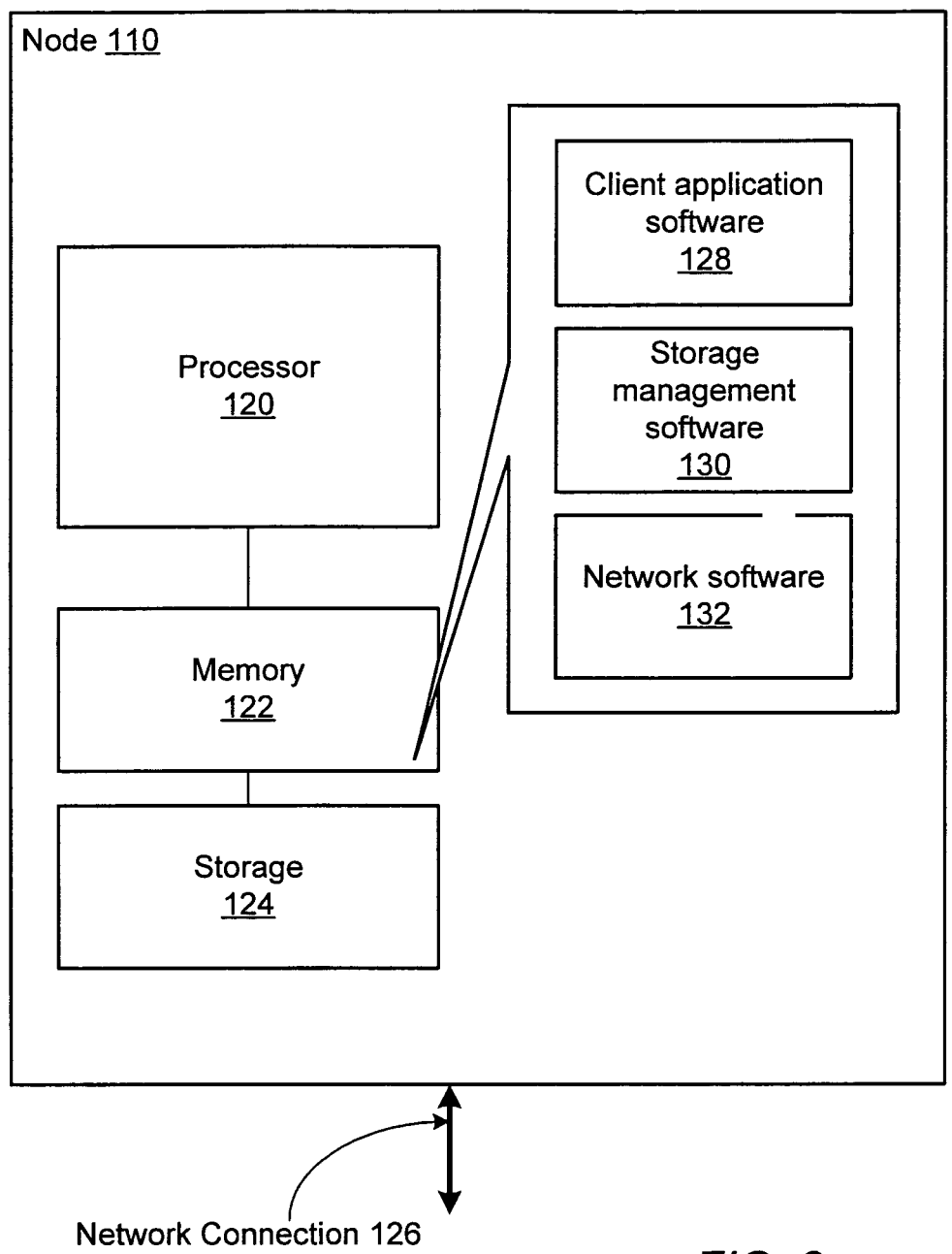
FIG. 2 illustrates one embodiment of a node in the distributed data storage network.

Referring now to FIG. 2, a diagram of one embodiment of a node 110 in the distributed data storage network 100 is illustrated. Generally speaking, node 110 may include any of various hardware and software components. In the illustrated embodiment, node 110 includes a processor 120 coupled to a memory 122, which is in turn coupled to a storage 124. Node 110 may also include a network connection 126 through which the node 110 couples to the network 102.

The processor 120 may be configured to execute instructions and to operate on data stored within memory 122. In one embodiment, processor 120 may operate in conjunction with memory 122 in a paged mode, such that frequently used pages of memory may be paged in and out of memory 122 from storage 124 according to conventional techniques. It is noted that processor 120 is representative of any type of processor. For example, in one embodiment, processor 120 may be compatible with the x86 architecture, while in another embodiment processor 120 may be compatible with the SPARC™ family of processors.

Memory 122 may be configured to store instructions and/or data. In one embodiment, memory 122 may include one or more forms of random access memory (RAM) such as dynamic RAM (DRAM) or synchronous DRAM (SDRAM). However, in other embodiments, memory 122 may include any other type of memory instead or in addition.

Storage 124 may be configured to store instructions and/or data, e.g., may be configured to persistently store instructions and/or data. In one embodiment, storage 124 may include non-volatile memory, such as magnetic media, e.g., one or more hard drives, or optical storage. In one embodiment, storage 124 may include a mass storage device or system. For example, in one embodiment, storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 124 may include tape drives, optical storage devices or RAM disks, for example.

Network connection 126 may include any type of hardware for coupling the node 110 to the network 102, e.g., depending on the type of node 110 and type of network 102. As shown in FIG. 2, memory 122 may store network software 132. The network software 132 may include software that is executable by processor 120 to interact with or control the network connection 126, e.g., to send and receive data via the network connection 126. In one embodiment, the network software 132 may also include software operable to create and manage topology and routing information for the data storage network 100 and software operable to utilize the topology and routing information to route messages to other nodes 110.

Memory 122 may also store storage management software 130 that is executable by processor 120 to manage the storage of data on the node 110 in relation to data stored on other nodes 110. The storage management software 130 executing on the node 110 may utilize the network software 132 to communicate with storage management software 130 executing on other nodes. In one embodiment, memory 122 may also store client application software 128.

Figure 3:
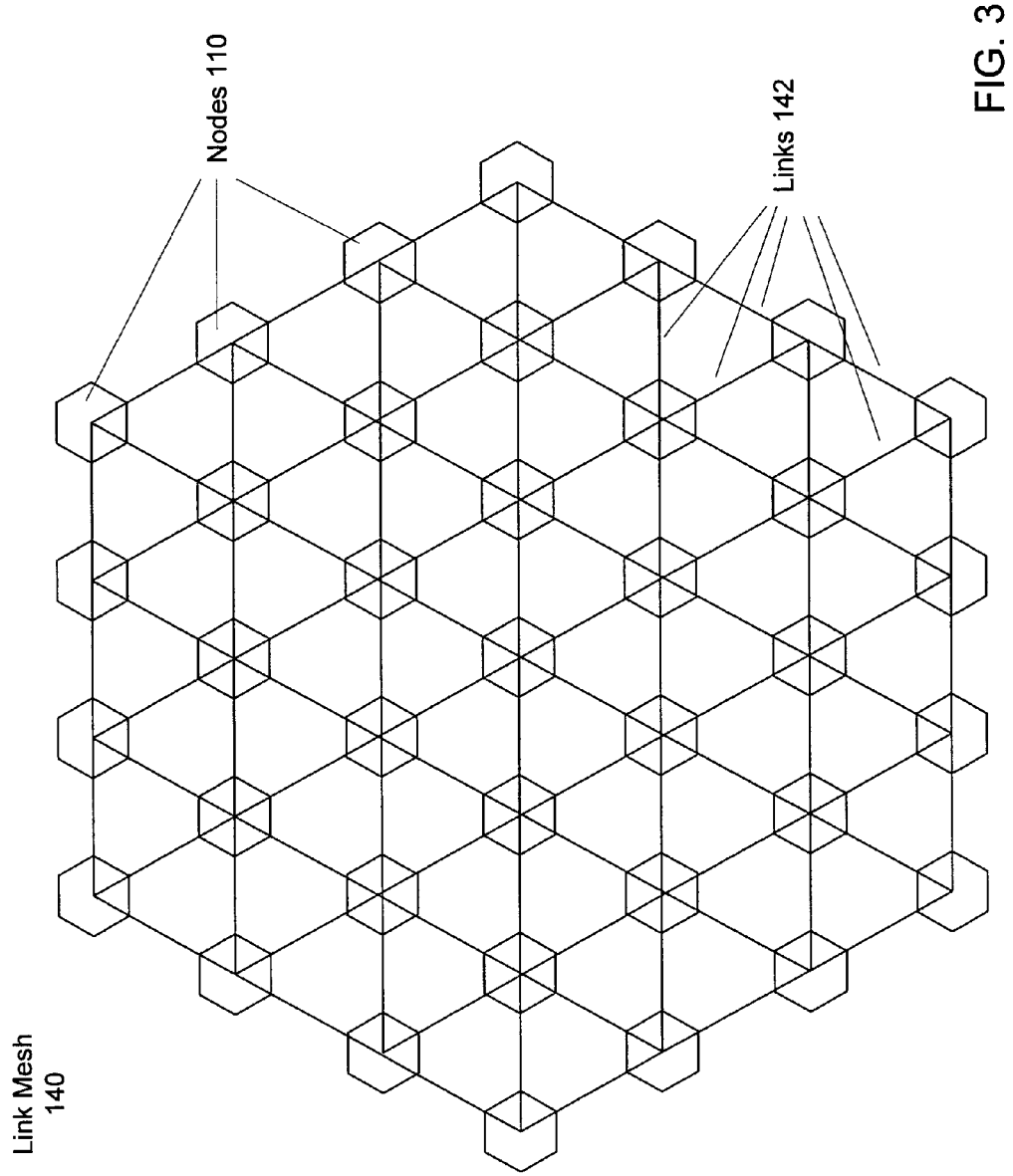
FIG. 3 illustrates an exemplary link mesh for a set of nodes.

In one embodiment, as each node 110 joins the distributed data storage network 100, the node may establish links 142 with at least a subset of other nodes 110 in the network 100. As used herein, a link 142 comprises a virtual communication channel or connection between two nodes 110. The network software 132 may be responsible for performing a node discovery process and creating links with other nodes as a node comes online in the network 100. The resulting set of connected nodes is referred to herein as a link mesh 140. FIG. 3 illustrates an exemplary link mesh 140 for a set of nodes 110.

Each hexagon represents a node 110, and each line represents a link 142 between two nodes 110.

In various embodiments, any network communication model or protocol may be utilized to allow the nodes 110 to communicate with each other. In one embodiment, the network software 132 may provide storage management software 130 with a tree-based view of the underlying link mesh as a means of exchanging messages between nodes 110. As used herein, a tree may comprise an undirected, acyclic, and connected sub-graph of the underlying link mesh 140. Each vertex in a tree may be a node 110. Each connection between nodes 110 in a tree is referred to herein as an edge. Thus, each tree effectively comprises a subset of the link mesh. In other embodiments, the network software 132 may utilize any of various other kinds of topology and routing models.

In one embodiment, the storage management software 130 executing on the various nodes 110 may coordinate to implement a type of storage management for the distributed data storage network 100 referred to herein as "goal-oriented storage management" or "GOSM". Goal-oriented storage management may aim to make the distributed data storage network a self-provisioning, self-optimizing, and self-healing entity by enabling the distributed data storage network to adapt itself to changes in its environment in the pursuit of high-level system-wide storage goals. The storage management software 130 on the nodes 110 may implement a distributed computing technique to provision, optimize, and manage data stored on the nodes 110 in such a way as to meet these system-wide storage goals.

According to the idea of goal-oriented storage management, the nodes 110 do not merely respond to statically configured policy rules (typically based on resource thresholds), but instead respond to changes in the system to incrementally move the system progressively to more optimal states as defined by one or more goal metrics. The goal metrics may be defined in a manner that allows the system to accomplish objectives such as storage utilization, performance, reliability, etc. The nodes 110 may coordinate to perform an optimization technique used to improve the system-wide metric. The technique may allow the distributed data storage network to converge to or to track an optimal state (or the goal). The technique may be robust enough find the globally optimal state for the entire system so that nodes do not become stuck in locally optimal states.

As described above, in one embodiment, the distributed data storage network 100 may be implemented as a peer-to-peer network. The peer-to-peer network may perform the goal-oriented storage management using a principle of collective information processing between nodes in the effort to optimize the state of the system. Resources available throughout the various nodes (not just a particular node or an immediate neighborhood of nodes) may be effectively leveraged to enable the system to converge toward the goal. However, the storage management software 130 executing on each node may utilize knowledge that the node has available locally or knowledge available on its immediately neighboring nodes. Effectively, node-level optimizations may be performed by each node to incrementally achieve a system-wide optimization.

Role-Based Addressing

Most communication protocols require some addressing scheme to name a destination endpoint (such as a node) as the target of a message. IP-based protocols for example, use an IP address to name a node on a network.

In one embodiment, message addressing in the distributed data storage network 100 may be based on the concept of a "role". As used herein, a role may refer to a location-independent address for a computer network. Each tree may have one or more nodes that may be addressed by a "role". Each message may be addressed to a particular role on a particular tree. Thus, when the message is sent to the role associated with the tree, only nodes attached to the specified tree receive the message, e.g., as opposed to all nodes on the link mesh or tree receiving the message.

In one embodiment each role may be identified using a string, e.g., the name of the role. In other embodiments, roles may be identified in other ways, e.g., using integers. A message address may include information identifying a tree and a role on the tree. For example, in one embodiment the tree may be identified using a tree ID, such as a 128-bit Universally Unique ID (UUID), and a role may be identified using a variable length string. In another embodiment, a message address may also include information identifying a protocol ID. Thus, each message may be sent on a particular tree and, more particularly, to a particular set of nodes on the tree, i.e., the nodes having the specified role. As the message arrives to each node on the specified tree and having the specified role, the protocol ID may be used to determine which protocol on the node (or which portion of software) receives the message.

In some applications, sending messages to roles instead of directly to nodes may have certain advantages. For example, a given role may be assigned to any tree vertex (node), and the role may move from node to node dynamically. Also, a single role may be assigned to multiple tree nodes. Thus, a message addressed to the role may reach each of the nodes which have the role.

Role-based addressing may also allow distributed software to run in a peer-to-peer manner. Nodes do not need to keep track of global state, such as knowing which other nodes are present on the network or which roles are bound to which nodes. A node may simply accomplish an operation by routing a message to a particular role, without needing to know which particular node or nodes have the role.

A role which is restricted to a single node is referred to herein as an exclusive role. A role which is associated with multiple nodes is referred to herein as a non-exclusive or shared role. (It is noted that a non-exclusive role may be associated with a single node.) Each instance of a role may have an associated role instance ID, such as a 128-bit UUID.

Each node may maintain a list of role instances which are associated with that node for each tree. The node may also maintain routing information that allows messages to be routed from the node to remote roles, i.e., role instances associated with other nodes. For example, the routing information may define one or more edges for the node. Each edge may be mapped to one of the node's links and may be used to route a message to one or more instances of a role. Each link may support many mapped tree edges. Thus, at each node along the message path from a sender node to the target node(s), the node may deliver the message to a local instance of the role (if there is one) and may forward the message to other role instances using the respective edge or edges.

Suitable implementations of systems that employ exemplary role-based addressing techniques may be found in co-pending U.S. patent application Ser. No. 10/326,682 titled "Topology and Routing Model for a Computer Network," filed Dec. 20, 2002, which is hereby incorporated by reference in its entirety.

Figure 4:
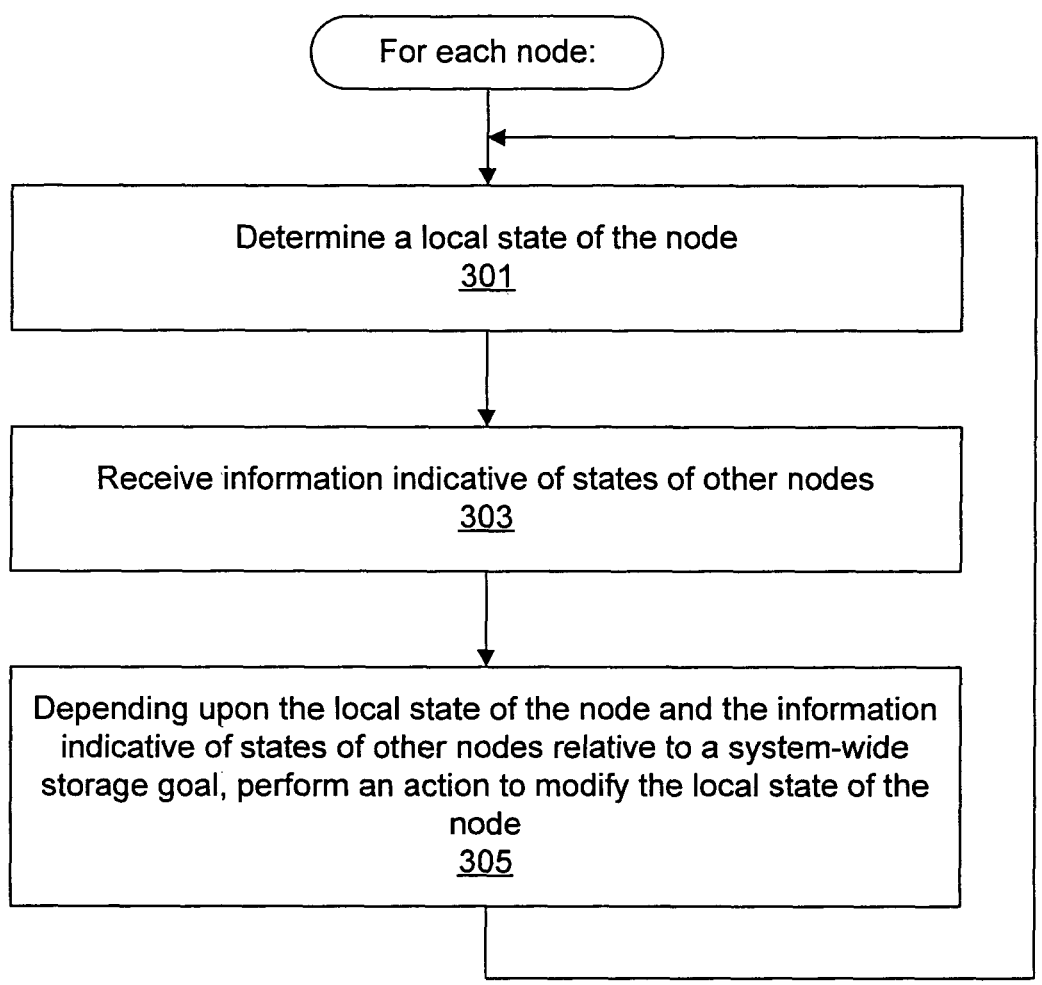
FIG. 4 is a flowchart diagram illustrating one embodiment of a method for performing goal-oriented storage management for a distributed data storage network.

FIG. 4—Method for Performing Goal-Oriented Storage Management

FIG. 4 is a flowchart diagram illustrating one embodiment of a method for performing goal-oriented storage management for a distributed data storage network 100. It is noted that FIG. 4 illustrates a representative embodiment, and alternative embodiments are contemplated.

As described above, storage management software 130 may execute on each node to cause the distributed data storage network to converge toward a system-wide storage goal. As used herein, the term "system-wide storage goal" may refer to a goal relative to the distributed data storage network 100 as a whole, rather than a goal for any individual node in the network. In various embodiments, the system-wide storage goal may be defined to accomplish any of various kinds of optimizations or performance improvements for the system, such as storage utilization, data replication, performance, reliability, etc. According to one embodiment, the storage management software 130 executing on each node may perform the following.

As shown in 301, the node may determine its local state. In various embodiments, determining the local state of the node may comprise determining any of various storage or operating characteristics of the node, depending on the goal defined for the system. For example, if the system-wide storage goal is designed to balance storage utilization equally across nodes in the network, then determining the local state of the node may comprise determining the amount of the node's storage that is currently utilized. In other embodiments, determining the local state of the node may comprise determining other attributes regarding the node, such as:

an amount of free storage available on the node
speed of the node's CPU
recent CPU utilization on the node, e.g., CPU utilization over the last day
valency
network bandwidth available or utilized on the node In 303, the node may receive information indicative of states of other nodes. The information may specify similar storage or operating characteristics for the other nodes as were determined for the local node. For example, if the local state of the node is based on the amount of the node's storage that is currently utilized, then the states of the other nodes may be based on the amount of storage utilized on the other nodes. In various embodiments, any technique may be utilized to enable the node to receive information indicative of states of other nodes. Exemplary techniques are discussed below.

In 305, depending upon the local state of the node and the information indicative of states of other nodes relative to the system-wide storage goal, an action may be performed to modify the local state of the node. Any of various actions may be performed, depending on the particular storage goal and depending on how the local state of the node compares to the states of the other nodes. Exemplary actions include: initiating a transfer operation to transfer data to the node from another node; initiating a transfer operation to transfer data from the node to another node; and/or deleting data from the node.

For example, if the system-wide goal is to balance storage utilization equally across nodes in the network, then if the node determines that its storage utilization is less than the average storage utilization, the node may perform an action to initiate the transfer of data from a node with a larger percentage of its storage utilized.

As indicated by the flowchart arrow returning from 305 to 301, each node in the network may perform 301, 303, and 305 repeatedly. This may cause the system to converge upon the system-wide storage goal. The system may not be guaranteed of reaching the goal. However, the method may allow the system to continually move toward the goal, offering probabilistic assurances that the goal will be reached.

In one embodiment, a plurality of groups may be defined, where each group may have zero or more nodes as members. Each group may correspond to a set of node states or a range of node states and may have one or more conditions for membership that nodes must satisfy to be members of the group. At any given time, each node may be a member of one group, depending on the local state of the node. Nodes may be responsible for dynamically adding and removing themselves from groups to reflect changes in their local states.

Thus, in one embodiment, in addition to the node determining its local state in 301, the node may also determine a first group that corresponds to the local state of the node and add itself as a member of the first group. If the node was previously a member of a second group, the node may also remove itself from the second group.

In this embodiment, receiving the information indicative of states of other nodes in 303 may comprise receiving information regarding the plurality of groups. For example, the information may indicate how many nodes each group has as a member. In one embodiment, the information may also identify which nodes are members of each group. Thus, each node may be able to determine a state of the system as a whole and determine how the local state of the node compares to states of other nodes based on the information regarding the plurality of groups. In one embodiment, each group may comprise a resource role. In this embodiment, a node may add itself to a group by adding an instance of the appropriate resource role on the node. Resource roles are described in detail below.

Resource Roles

As discussed above, in one embodiment, the distributed data storage network 100 may utilize role-based addressing. Role-based addressing may provide a flexible, efficient, and failure-resistant mechanism for addressing groups of nodes in the network. By addressing a message to a particular role, each node that is a member of the role (i.e., each node that holds an instance of the role) may receive the message.

In one embodiment, roles may be utilized to enable a node to address nodes that are similar to each other with each respect to the state that they are currently in. As used herein, a resource role comprises a role that designates a grouping of nodes based on a common level of utilization or availability of a specific resource. Resource Roles may reflect the state of availability or utilization of node resources such as storage, computing power, network bandwidth, etc. Thus, membership in a resource role may be based on any of various attributes of a node, such as storage or operating characteristics. As one example, resource roles may be defined to represent the amount of storage utilized on each node. For example, a resource role may be defined to represent utilized storage in the range of 10% to 12%. Thus, each node in the network whose percentage of utilized storage falls within the 10%-12% range may be a member of that resource role. Other resource roles may be defined to represent other ranges so that each node is a member of a role representing the amount of storage utilized on the node.

Thus, associated with each resource role is a condition that a node must satisfy to be a member of that resource role. Each node may monitor its own state to determine whether the node should add or remove itself from various resource roles, as appropriate. Each node may decide for itself whether it is a member of a given resource role based on the node's own state. If the membership criteria for a resource role were previously unsatisfied but become satisfied, then the node may add itself to the role (i.e., may create a local instance of the role). Similarly, if the membership criteria for a resource role were previously satisfied but become unsatisfied, then the node may remove itself from the role (i.e., may destroy its local instance of the role). The membership of nodes in resource roles is therefore dynamic. For example, suppose that a first resource role is defined to represent utilized storage in the range of 10% to 12%, and a second resource role is defined to represent utilized storage in the range of 13% to 15%. If the storage utilized on a node increases from 12% to 13%, then the node may remove itself from the first role and add itself to the second role.

Resource roles may be defined to represent node states at any desired level of granularity. For example, instead of defining resource roles to represent storage utilization in the ranges of 10%-12%, 13%-15%, etc., resource roles could be defined to represent storage utilization in larger ranges (e.g., 0%-25%, 26%-50%, etc.) or smaller ranges (e.g., 0%-0.5%, 0.6%-1.0%, etc.). In one embodiment, resource roles may be defined to model a relatively broad range of states to reduce overhead involved with adding and removing nodes to/from the resource roles.

In addition to storage utilization levels, resource roles may be based on any of various other node attributes or combination of attributes, such as:

Free storage available (e.g., roles may represent ranges such as 0-10 Mb, 10 Mb-100 Mb, 100 Mb-1 Gb, 1 Gb-10 Gb, 10 Gb-100 Gb, 100 Gb-1 Tb, 1 Tb-10 Tb, etc.)

Cpu (e.g., roles may represent ranges such as 1 GHz or less, 1-1.5 GHz, 1.5-2.0 GHz, 2.0-3.0 GHz, etc.)

Average cpu utilization over last day (e.g., roles may represent ranges such as 0-10%, 10-20%, 20-30%, etc.)

Valency (e.g., roles may represent values such as 1,2,3,4, 5,6,7,8,9,10)

Network bandwidth (e.g., roles may represent ranges such as 0 Mbps, 10-100 Mbps, 100 Mbps-1 Gbps, >1 Gbps, etc.)

In various embodiments, using resource roles may be advantageous in various ways. For example, nodes may automatically identify their own resources and categorize them, as described above. Also, resource roles may allow a node to identify and access resources throughout the network, not just local resources or resources of nodes in an immediate neighborhood. These resources may be identified and accessed using the respective resource role names. The resource role names are local knowledge possessed by the node. In one embodiment, instead of individual nodes sending messages repeatedly to get hold of a required system resource, the mapping of resources to nodes may be done by the system once and kept up-to-date. By unifying searches that would have been done by nodes individually, resource roles may improve performance.

As described above, in various embodiments, any of various kinds of system-wide storage goals may be defined for the distributed data storage network. In one particular embodiment as discussed below, the distributed data storage network 100 may be configured to converge upon a goal to balance the percentage of storage that is utilized by each node 110.

In such an embodiment, a metric may be defined to measure the distance between the current overall system state and the optimal state of the system. For the problem of storage utilization balancing, the ideal state of the system is when each of the nodes has the same percentage utilization. This represents a perfect balance of storage between the nodes. Let $$U_{av}=S_{used}(\text{System})/S_{total}(\text{System})$$

be the average system-wide percentage utilization, where $S_{used}$ (System) represents the total amount of storage utilized in the system (i.e., the sum of storage utilized by the individual nodes in the distributed data storage network) and $S_{total}$ (System) represents the total amount of storage capacity in the system (i.e., the sum of storage capacities of the individual nodes in the distributed data storage network).

And let $$U_i=S_{used}(\text{Node}_i)/S_{total}(\text{Node}_i)$$

be the percentage utilization of $\text{Node}_i$, where there are N nodes in the system and i ranges from 1 to N. $S_{used}(\text{Node}_i)$ represents the amount of storage used on $\text{Node}_i$ and $S_{total}(\text{Node}_i)$ represents the storage capacity of $\text{Node}_i$.

A metric for the storage utilization goal can be expressed as $$M=\Sigma_i(U_i-U_{av})^2$$

where i ranges from 1 to N.

An optimal state for storage utilization can be expressed as M=0. Accordingly, in one embodiment the storage management software 130 of each node may be configured to reduce the metric M locally, by reducing the component of M that applies to the node. This may involve transferring files from nodes that have a storage utilization greater than the average to nodes that have a storage utilization lower than the average. Thus, nodes can continually improve upon the goal metric by monitoring themselves and taking local action. The storage management software 130 may further employ resource roles, as described above. In this context, resource roles may be useful for each node to find out and address the set of nodes that are using more than or less than the average utilization for the entire system.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for distributed data storage, the system comprising:
   a plurality of computing nodes, wherein
      each node of the plurality of computing nodes includes memory and one or more processors,
      the each node of the plurality of computing nodes is configured to execute storage management software that causes the system to converge toward a system-wide storage goal, wherein
         the storage management software is configured to implement role-based addressing such that the plurality of nodes do not need to maintain information regarding a global state of the system,
      the memory of each respective node of the plurality of computing nodes stores program instructions executable by the one or more processors of the respective node to determine a local state of the respective node, and
      at least one node of the plurality of computing nodes is associated with a corresponding exclusive role of a plurality of exclusive roles and at least two nodes of the plurality of computing nodes are associated with a shared role; and a goal-oriented storage manager configured to
select a first node group from a plurality of node groups, wherein
the first node group corresponds to the local state of the respective node, and
the first node group is associated with a resource role,
add the respective node to the first node group,
receive information regarding each node group of the plurality of node groups,
determine states of other nodes of the plurality of computing nodes based on the information regarding each node group, and
depending upon the local state of the respective node and the states of the other nodes relative to the system-wide storage goal, perform an action to modify the local state of the respective node to conform the local state to the system-wide storage goal such that an optimal state for the distributed data storage system is identified, wherein
the optimal state is defined by at least one goal metric,
the plurality of exclusive roles are defined to represent a range of utilization of a plurality of node resources, and
the distributed data storage system converges towards the optimal state based on the system-wide storage goal.

2. The system of claim 1,
wherein each respective node group of the plurality of node groups corresponds to a respective set of node states.

3. The system of claim 1,
wherein the program instructions are further executable by the one or more processors of the respective node to:
determine a change in the local state of the respective node;
perform the following in response to determining the change in the local state of the respective node:
select a second node group from the plurality of node groups, wherein the second node group corresponds to the changed local state of the respective node;
remove the respective node from the first node group; and
add the respective node to the second node group.

4. The system of claim 1,
wherein the plurality of node groups includes a second node group;
wherein receiving the information regarding each node group of the plurality of node groups comprises receiving information indicating one or more nodes in the second node group;
wherein the program instructions are further executable by the one or more processors of the respective node to select a particular node in the second node group;
wherein performing the action to modify the local state of the respective node comprises the respective node communicating with the particular node in the second node group to perform the action.

5. The system of claim 1,
wherein the program instructions are further executable by the one or more processors of the respective node to:
determine an average utilization amount of resources for the plurality of computing nodes based on the local state of the respective node and the states of the other nodes; and
determine that a utilization amount of a resource on the respective node is greater than the average utilization amount for the plurality of computing nodes;

wherein performing the action to modify the local state of the respective node comprises performing an action to decrease the utilization amount of the resource on the respective node.

6. The system of claim 1,
wherein the program instructions are further executable by the one or more processors of the respective node to:
determine an average utilization amount of resources for the plurality of nodes based on the local state of the respective node and the states of the other nodes; and
determine that a utilization amount of a resource on the respective node is less than the average utilization amount for the plurality of computing nodes;
wherein performing the action to modify the local state of the respective node comprises performing an action to increase the utilization amount of the resource on the respective node.

7. The system of claims 1,
wherein performing the action to modify the local state of the respective node comprises one or more of:
initiating a transfer operation to transfer data to the respective node from another node;
initiating a transfer operation to transfer data from the respective node to another node; and
deleting data from the respective node.

8. The system of claim 1,
wherein the plurality of computing nodes operate together a peer-to-peer manner to converge upon the system-wide storage goal.

9. The system of claim 1,
wherein each node group has a corresponding network address;
wherein receiving the information regarding each node group comprises receiving the information in response to sending one or more messages to each of the network addresses corresponding to the node groups.

10. The system of claim 1,
wherein the system-wide storage goal comprises a goal of balancing a percentage of storage utilized by the nodes;
wherein determining the local state of the respective node comprises determining a percentage of storage utilized by the respective node;
wherein determining the states of the other nodes comprises determining information indicative of percentages of storage utilized by the other nodes;
wherein performing the action to modify the local state of the respective node comprises performing an action to modify an amount of data stored by the respective node.

11. The system of claims 10,
wherein performing the action to modify the amount of data stored by the respective node comprises transferring data to the respective node from a node with a higher percentage of utilized storage.

12. The system of claim 1,
wherein each respective node repeatedly performs said operations to cause the system to converge upon the system-wide storage goal.

13. The system of claim 1 wherein the plurality of computing nodes comprise a plurality of role instances associable with each respective node of the plurality of computing nodes such that each respective node maintains a list of role instances associated with the plurality of computing nodes.

14. The system of claim 1 wherein the goal-oriented storage manager is configured to be executed by one of the plurality of computing nodes and is further configured to be managed by, among other things, the plurality of node groups.

15. The system of claim 1, wherein,
the respective node adds or removes itself from the first node group based on the range of availability or utilization of the plurality of node resources.

16. A computer-readable memory medium comprising program instructions executable to implement a method comprising:
each respective node of a plurality of nodes performing the following:
executing storage management software that causes a distributed data storage system to converge towards a system-wide storage goal, wherein
the storage management software is configured to implement role-based addressing such that the plurality of nodes do not need to maintain information regarding a global state of the system,
determining a local state of the respective node wherein at least one node of the plurality of computing nodes is associated with a corresponding exclusive role of a plurality of exclusive roles and at least two nodes of the plurality of computing nodes are associated with a shared role;
selecting a first node group from a plurality of node groups, wherein
the first node group corresponds to the local state of the respective node, and
the first node group in associated with a resource role;
adding the respective node to the first node group;
receiving information regarding each node group of the plurality of node groups;
determining states of other nodes of the plurality of nodes based on the information regarding each node group; and
depending upon the local state of the respective node and the states of the other nodes relative to the system-wide storage goal, performing an action to modify the local state of the respective node to conform the local state to the system-wide storage goal such that an optimal state for the distributed data storage system is identified, wherein
the optimal state is defined by at least one goal metric,
the plurality of exclusive roles are defined to represent a range of utilization of a plurality of node resources, and
the distributed data storage system converges towards the optimal state based on the system-wide storage goal.

17. The computer-readable memory medium of claim 16, wherein each respective node group of the plurality of node groups corresponds to a respective set of node states.

18. The computer-readable memory medium of claim 16, wherein the method implemented by the program instructions further comprises:
each respective node of the plurality of nodes performing the following:
determining a change in the local state of the respective node;
performing the following in response to determining the change in the local state of the respective node:
selecting a second node group from the plurality of node groups, wherein the second node group corresponds to the changed local state of the respective node;
removing the respective node from the first node group; and
adding the respective node to the second node group.

19. The computer-readable memory medium of claim 16, wherein the plurality of node groups includes a second node group;
wherein receiving the information regarding each node group of the plurality of node groups comprises receiving information indicating one or more nodes in the second node group;
wherein the method implemented by the program instructions further comprises selecting a particular node in the second node group;
wherein performing the action to modify the local state of the respective node comprises the respective node communicating with the particular node in the second node group to perform the action.

20. The computer-readable memory medium of claim 16, wherein the method implemented by the program instructions further comprises:
determining an average utilization amount of resources for the plurality of nodes based on the local state of the respective node and the states of the other nodes; and
determining that a utilization amount of a resource on the respective node is greater than the average utilization amount for the plurality of nodes;
wherein performing the action to modify the local state of the respective node comprises performing an action to decrease the utilization amount of the resource on the respective node.

21. The computer-readable memory medium of claim 16, wherein the method implemented by the program instructions further comprises:
determining an average utilization amount of resources for the plurality of nodes based on the local state of the respective node and the states of the other nodes; and
determining that a utilization amount of a resource on the respective node is less than the average utilization amount for the plurality of nodes;
wherein performing the action to modify the local state of the respective node comprises performing an action to increase the utilization amount of the resource on the respective node.

22. The computer-readable memory medium of claim 16, wherein each node group has a corresponding network address;
wherein receiving the information regarding each node group comprises receiving the information in response to sending one or more messages to each of the network addresses corresponding to the node groups.

23. A method comprising:
each respective node of a plurality of nodes performing the following:
executing storage management software that causes a distributed data storage system to converge towards a system-wide storage goal, wherein
the storage management software is configured to implement role-based addressing such that the plurality of nodes do not need to maintain information regarding a global state of the system,
determining a local state of the respective node wherein at least one node of the plurality of computing nodes is associated with a corresponding exclusive role of a plurality of exclusive roles and at least two nodes of the plurality of computing nodes is are associated with a shared role;
selecting a first node group from a plurality of node groups, wherein the first node group corresponds to the local state of the respective node, and the first node group is associated with a resource role;

adding the respective node to the first node group;

receiving information regarding each node group of the plurality of node groups;

determining states of other nodes of the plurality of nodes based on the information regarding the node groups; and depending upon the local state of the respective node and the states of the other nodes relative to the system-wide storage goal, performing an action to modify the local state of the respective node to conform the local state to the system-wide storage goal such that an optimal state for the distributed data storage system is identified, wherein the optimal state is defined by at least one goal metric, the plurality of exclusive roles are defined to represent a range of utilization of a plurality of node resources, and the distributed data storage system converges towards the optimal state based on the system-wide storage goal.

* * * * *